(No Model.)

J. B. LANGAN.
PAN FOR PACKING CANDY.

No. 345,907. Patented July 20, 1886.

WITNESSES:
W. M. Hill.
Chr. E. Davis

INVENTOR
John B. Langan
BY E. L. Thurston
ATTORNEY

UNITED STATES PATENT OFFICE.

JOHN B. LANGAN, OF CHICAGO, ILLINOIS.

PAN FOR PACKING CANDY.

SPECIFICATION forming part of Letters Patent No. 345,907, dated July 20, 1886.

Application filed April 17, 1886. Serial No. 199,178. (No model.)

*To all whom it may concern:*

Be it known that I, JOHN B. LANGAN, of Chicago, in the county of Cook and State of Illinois, have invented certain new and useful Improvements in Candy-Pans, of which the following is a description, reference being had to the accompanying drawings, which are made a part of this specification.

In distributing some candies, especially caromels, to the retail stores from the manufactories a large shallow tin pan of the ordinary construction is at present used, it being necessary from the nature of caromels to pack them only in a single layer. By frequent handling these pans become bent and battered out of shape, so that the bottoms are no longer flat, as is necessary, and so that the covers of the various pans used do not fit interchangeably, as it is desirable they should when using a large number of pans each day. The pans and covers therefore quickly become useless and have to be straightened out frequently. This soon wears them out, when new pans are necessary. This rejuvenating of old pans and buying of new ones make an item of considerable expense, especially in large manufactories.

The object of my invention is to provide a pan for caromels and other candies, the sides of which will not be bent by the ordinary handling, and wherein the cover will also be protected from injury, thereby insuring a large saving to the candy manufacturers using them.

To this end it consists in a pan having rigid sides, preferably made of a single strip of wrought-iron, bent into the proper shape, with the ends riveted together, combined with internally-projecting brackets arranged near the upper edge of said sides to support a cover which sets into the pan below the upper edges of said sides, and having a bottom of tin or other material appropriately secured to said sides, also in the combination of rigid sides having internally-projecting brackets arranged near the upper edges thereof, with a removable bottom and means for retaining said bottom in place, and also in the various sub-combinations herein fully described, and definitely pointed out in the claims.

Figure 1:
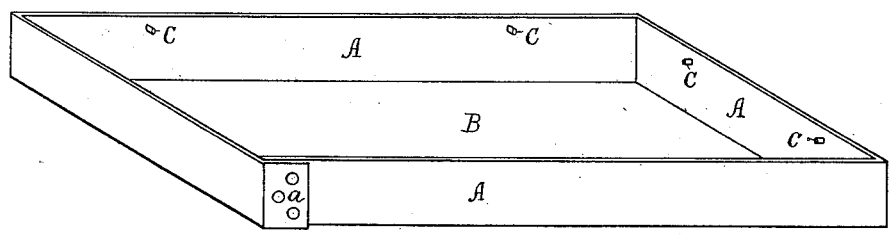
Figure 2:
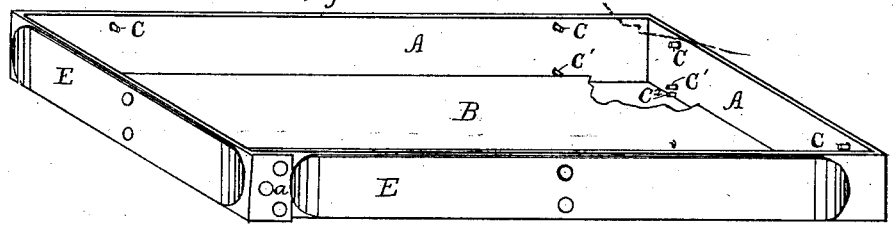
Figure 3:
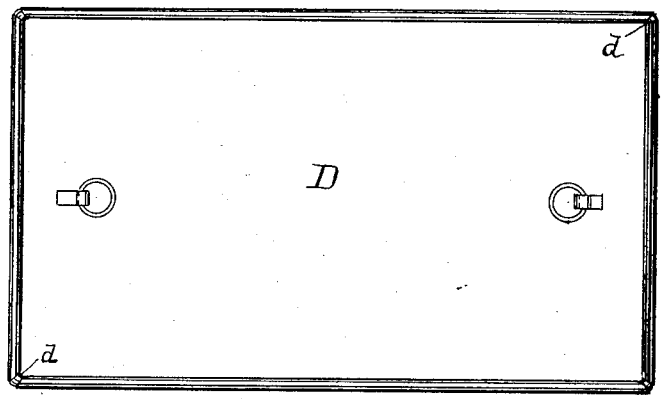

In the drawings, Figure 1 is a perspective view of one of my improved pans. Fig. 2 is a perspective view of another form thereof, and Fig. 3 is a plan view of the cover thereof.

Like letters represent similar parts in the several figures.

In the drawings, A represents the sides and B the bottom of the pan. The sides are made of some rigid material, preferably of a single strip of wrought-iron bent into the proper shape and having its ends riveted together at $a$, as shown. The bottom of the pan, which is preferably made of tin, may be soldered to these sides, or it may be supported upon internally-projecting pins or brackets, as shown in Fig. 2. Along the interior of the sides near the upper edges thereof are arranged a suitable number of brackets or pins, C C, &c. The object of these pins or brackets is to support the cover D, which is designed to set into the pan, so that it cannot be bent, when in place, without first bending the sides.

In Fig. 2, E E &c., represent flat springs, which are riveted near their centers, one to each side of the pan. Near their ends are secured the pins C and C'. These pins project through holes in the sides of the pan into the interior thereof, and they are arranged in substantially a vertical line one pin, C, near the upper edge of the sides, and another pin, C', near the lower edge of the sides at about the thickness of the bottom plate B above the pins $C^2$. The pins $C^2$ are permanently secured to the sides at their extreme lower edge.

The operation and function of these springs and pins are as follows: The bottom rests upon the pins $C^2$, while the pins C', which project inward just above said bottom, prevent it from being pushed upward from below. The cover D rests upon the pins C, as above explained. When it is desired to remove the bottom B for any purpose, the springs E are drawn outward by means of their ends which are preferably bent outward slightly, when the bottom may be easily pushed out. The cover D, which I prefer to use, consists of a piece of tin, having the sides turned or rolled over a wire, $d$, bent in the proper shape. This cover rests upon the internally-projecting pins or brackets C, and is below the level of the upper edge of the sides. It is evident that with this construction a pan is produced, which is perfectly adapted to the contemplated use and which cannot in the ordinary handling of such pans be bent or battered out of shape, while the bottom and cover can if necessary be easily replaced in each form of the device shown.

Having thus described my invention, what I claim as new and desire to secure by Letters Patent, is—

1. In a candy-pan, the combination of rigid sides, and a suitable bottom appropriately secured thereto, with internally-projecting brackets or pins secured to said sides near their upper edges, substantially as and for the purpose set forth.

2. In a candy-pan, the combination of a strip of wrought-iron bent to form the sides thereof, the ends being riveted together, and a suitable bottom appropriately connected therewith, combined with internally-projecting pins or brackets secured to said sides near the upper edges thereof, substantially as and for the purpose set forth.

3. In a candy-pan, the combination of rigid sides, a removable bottom, and means for retaining said bottom in place, substantially as and for the purpose set forth.

4. In a candy-pan, the combination of rigid sides, a removable bottom, and pins or brackets secured to said sides and adapted to sustain said bottom, with springs secured to said sides having pins on their outer ends, which project through said sides to the interior of the pan, substantially as and for the purpose set forth.

5. In a candy-pan, the combination of rigid sides and internally-projecting brackets or pins secured to said sides near their upper edges, with a removable bottom, and means for retaining said bottom in place, substantially as and for the purpose set forth.

JOHN B. LANGAN.

Witnesses:
L. HILL,
E. L. THURSTON.